US012803072B2

(12) United States Patent
Lee et al.

(10) Patent No.: US 12,803,072 B2
(45) Date of Patent: Nov. 17, 2026

(54) BATTERY MODULE AND BATTERY PACK INCLUDING THE SAME

(71) Applicant: LG ENERGY SOLUTION, LTD., Seoul (KR)

(72) Inventors: Jung Hoon Lee, Daejeon (KR); Dooseung Kim, Daejeon (KR); Jaehun Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 597 days.

(21) Appl. No.: 18/279,359

(22) PCT Filed: Nov. 3, 2022

(86) PCT No.: PCT/KR2022/017160
§ 371 (c)(1),
(2) Date: Aug. 29, 2023

(87) PCT Pub. No.: WO2023/090710
PCT Pub. Date: May 25, 2023

(65) Prior Publication Data

US 2024/0145806 A1 May 2, 2024

(30) Foreign Application Priority Data

Nov. 19, 2021 (KR) ........................ 10-2021-0159975
Oct. 27, 2022 (KR) ........................ 10-2022-0140425

(51) Int. Cl.
*H01M 10/613* (2014.01)
*H01M 10/647* (2014.01)
(Continued)

(52) U.S. Cl.
CPC ....... *H01M 10/613* (2015.04); *H01M 10/647* (2015.04); *H01M 10/653* (2015.04);
(Continued)

(58) Field of Classification Search
CPC ............. H01M 10/613; H01M 10/647; H01M 10/653; H01M 10/655; H01M 50/211;
(Continued)

(56) References Cited

U.S. PATENT DOCUMENTS

2005/0089750 A1 4/2005 Ng et al.
2011/0262792 A1 10/2011 Lee et al.
(Continued)

FOREIGN PATENT DOCUMENTS

CN 102257653 A 11/2011
CN 205194813 U 4/2016
(Continued)

OTHER PUBLICATIONS

English Translation of KR20160148404.*
(Continued)

*Primary Examiner* — Kiran Quraishi Akhtar
(74) *Attorney, Agent, or Firm* — Birch, Stewart, Kolasch & Birch, LLP

(57) ABSTRACT

A battery module includes battery cells stacked along one direction; a heat conducting member that transfers heat generated from the battery cells to the outside; and an insulating member surrounding the heat conducting member. At least one or more of the battery cells form a battery cell group, and at least one battery cell group is stacked to form a battery cell stack. A heat dissipation member including the heat conducting member and the insulating member may cover any one of a first surface and a second surface of the battery cell group facing each other in the stacking direction of the battery cell stack, and any one of a third surface and a fourth surface facing each other in a direction perpendicular to the stacking direction of the battery cell stack, and may cover any one of a first surface and a second surface facing each other in the stacking direction of the
(Continued)

battery cell stack of the other battery cell group adjacent to the any one battery cell group, and any one of a third surface and a fourth surface facing in a direction perpendicular to the stacking direction of the battery cell stack.

18 Claims, 14 Drawing Sheets

(51) Int. Cl.
*H01M 10/653* (2014.01)
*H01M 10/655* (2014.01)
*H01M 50/211* (2021.01)
*H01M 50/505* (2021.01)

(52) U.S. Cl.
CPC ....... *H01M 10/655* (2015.04); *H01M 50/211* (2021.01); *H01M 50/505* (2021.01)

(58) Field of Classification Search
CPC ........... H01M 50/505; H01M 10/6554; H01M 10/6556; H01M 50/507; Y02E 60/10
See application file for complete search history.

(56) References Cited

U.S. PATENT DOCUMENTS

| | | | | |
|---|---|---|---|---|
| 2013/0115506 | A1* | 5/2013 | Wayne | H01M 10/6551 429/120 |
| 2020/0194851 | A1 | 6/2020 | Seo et al. | |
| 2021/0013563 | A1 | 1/2021 | Park et al. | |
| 2022/0013836 | A1 | 1/2022 | Hwang | |
| 2022/0231355 | A1 | 7/2022 | Jang et al. | |
| 2022/0311100 | A1 | 9/2022 | Lim et al. | |

FOREIGN PATENT DOCUMENTS

| | | | | |
|---|---|---|---|---|
| CN | 205902315 U | 1/2017 | | |
| CN | 109346630 A | 2/2019 | | |
| CN | 111727527 A | 9/2020 | | |
| JP | 2004-227788 A | 8/2004 | | |
| JP | 2009-252501 A | 10/2009 | | |
| JP | 2012-136022 A | 7/2012 | | |
| JP | 2014-29808 A | 2/2014 | | |
| JP | 2017-130670 A | 7/2017 | | |
| JP | 2018-88305 A | 6/2018 | | |
| JP | 2019-16443 A | 1/2019 | | |
| JP | 2021-513194 A | 5/2021 | | |
| KR | 10-2004-0082437 A | 9/2004 | | |
| KR | 10-0944980 B1 | 3/2010 | | |
| KR | 10-2016-0148404 A | 12/2016 | | |
| KR | 20160148404 | 12/2016 | * | H01M 10/42 |
| KR | 10-2017-0021122 A | 2/2017 | | |
| KR | 10-1990590 B1 | 6/2019 | | |
| KR | 10-2019-0110782 A | 10/2019 | | |
| KR | 10-2020-0030965 A | 3/2020 | | |
| KR | 10-2020-0063059 A | 6/2020 | | |
| KR | 10-2021-0027862 A | 3/2021 | | |
| WO | WO 2019/082751 A1 | 5/2019 | | |
| WO | WO 2021/149955 A1 | 7/2021 | | |
| WO | WO 2021/221312 A1 | 11/2021 | | |

OTHER PUBLICATIONS

Extended European Search Report for European Application No. 22895917.7, dated Nov. 15, 2024.
International Search Report for PCT/KR2022/017160 mailed on Feb. 14, 2023.

* cited by examiner

【FIG. 1】
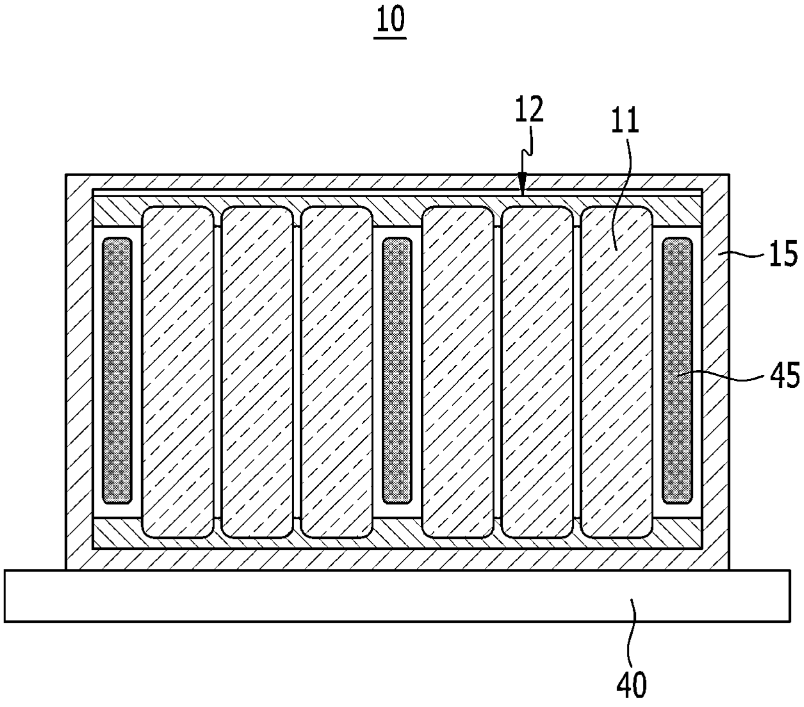

【FIG. 2】
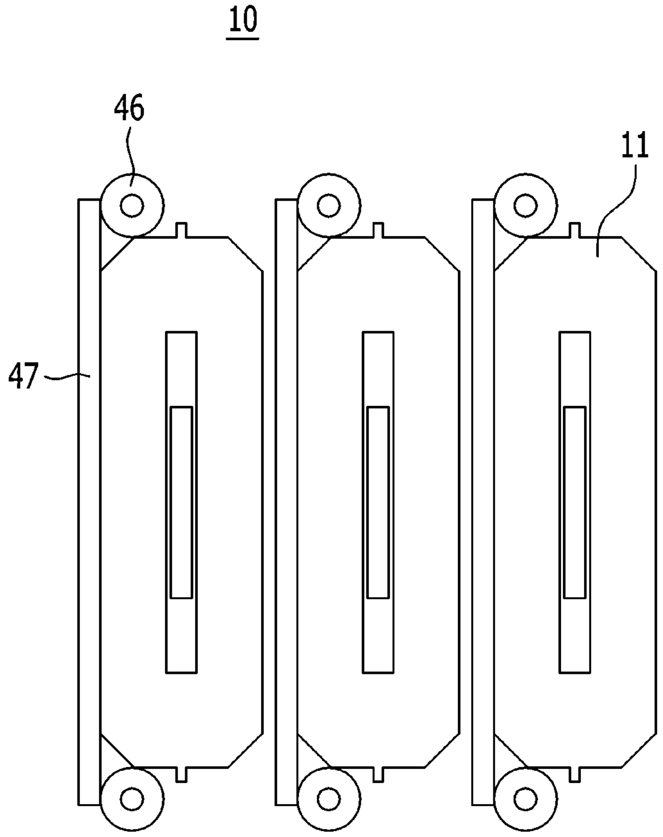

【FIG. 3】
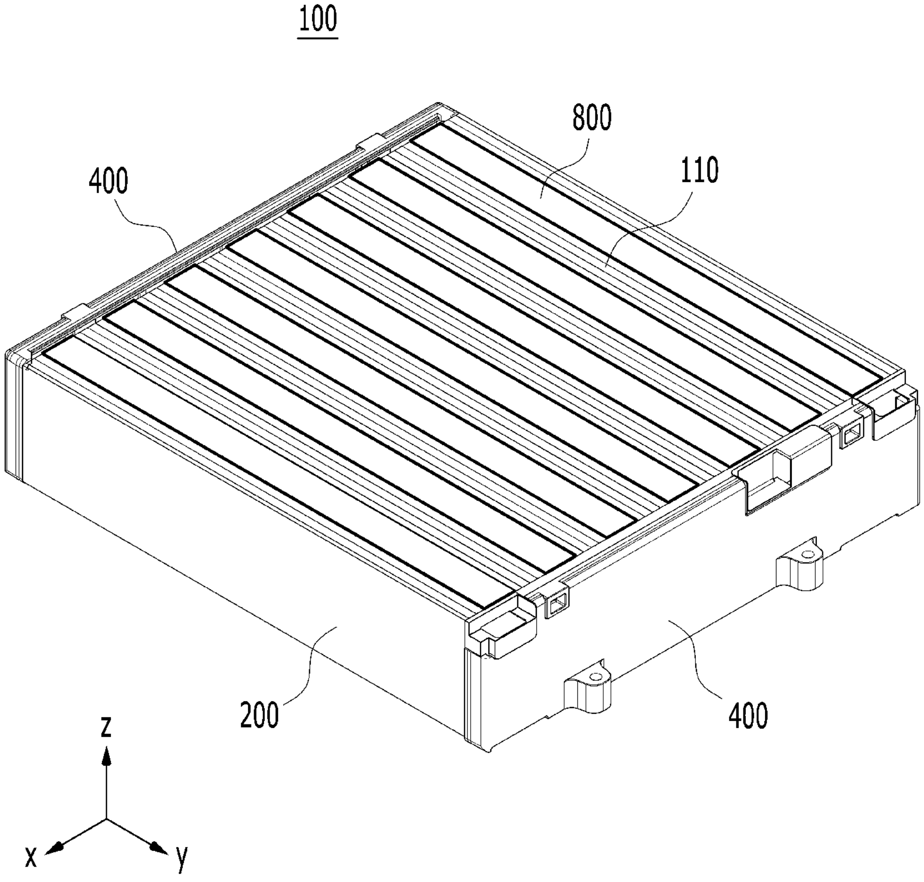

【FIG. 4】
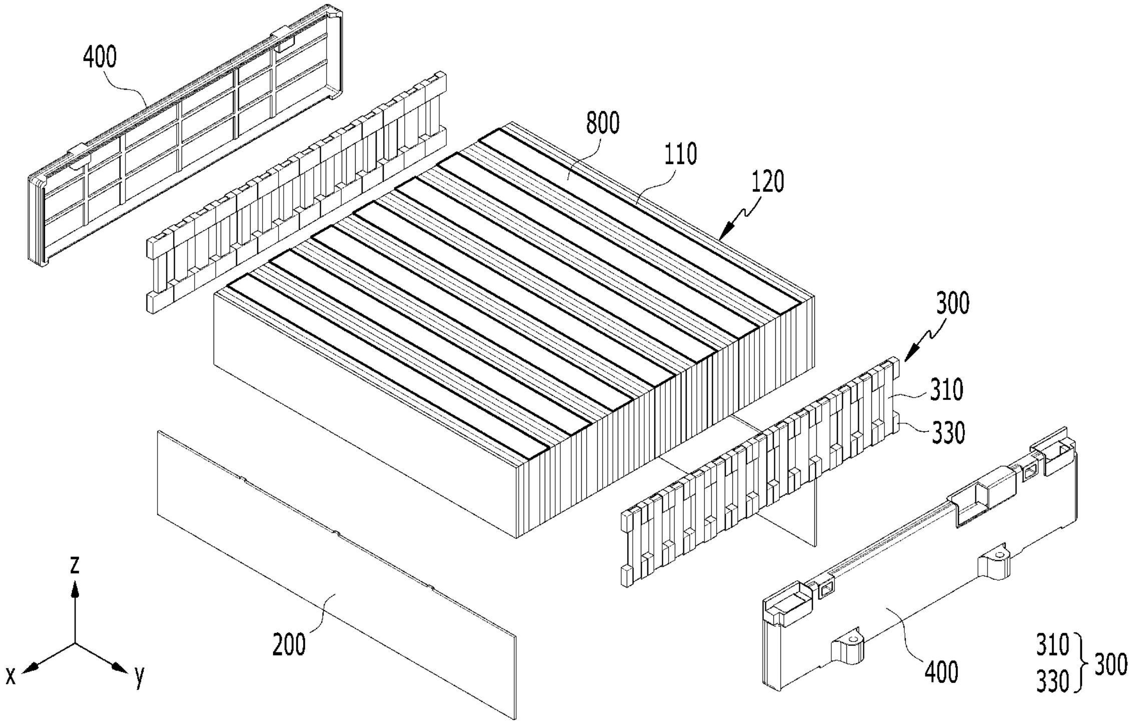

【FIG. 5】
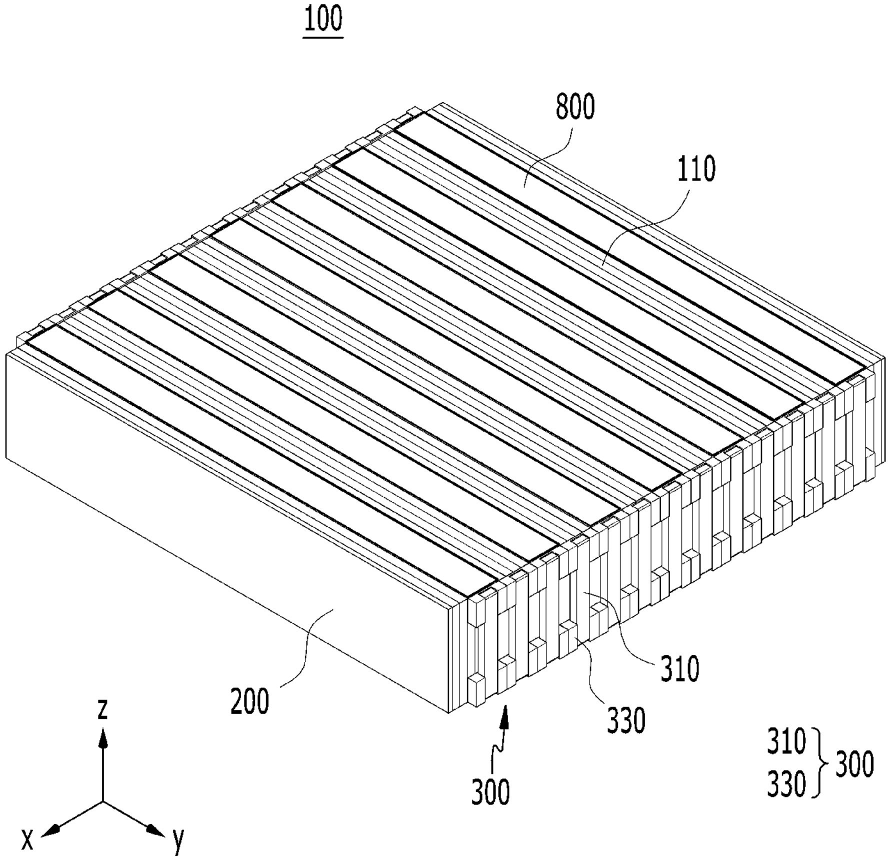

【FIG. 6】
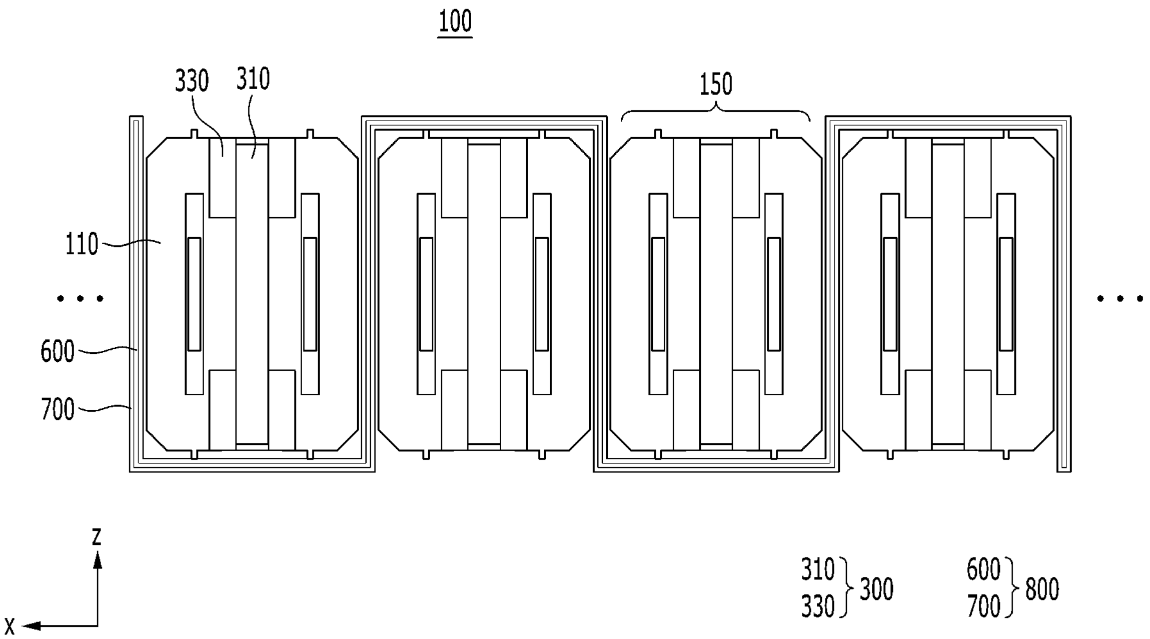
【FIG. 7】
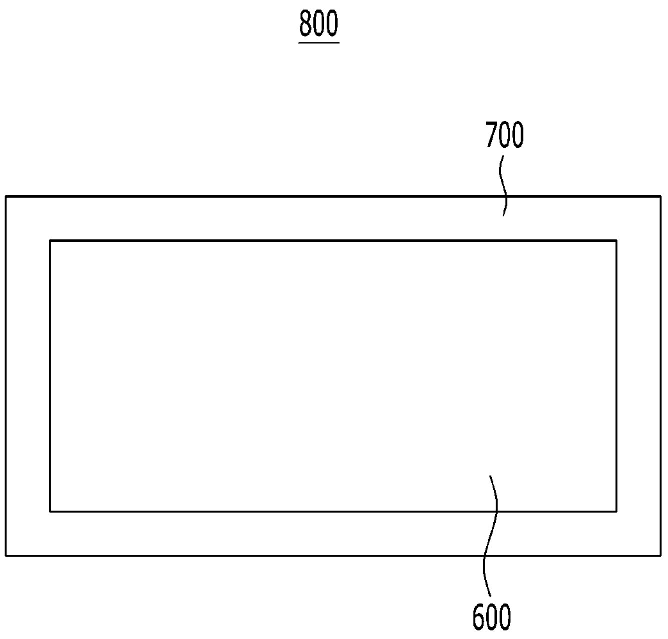

【FIG. 8】
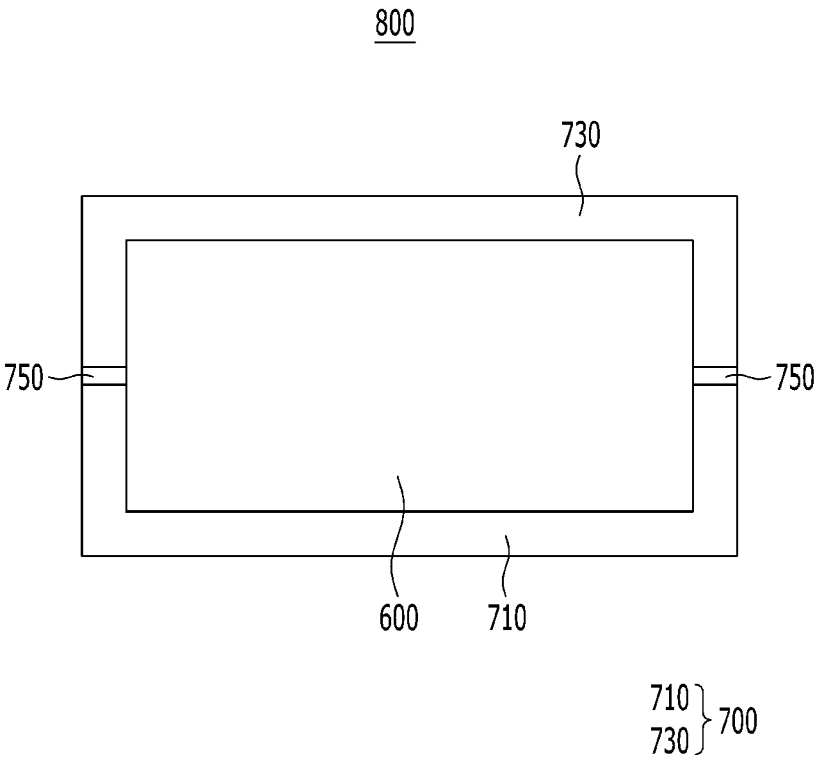

【FIG. 9】
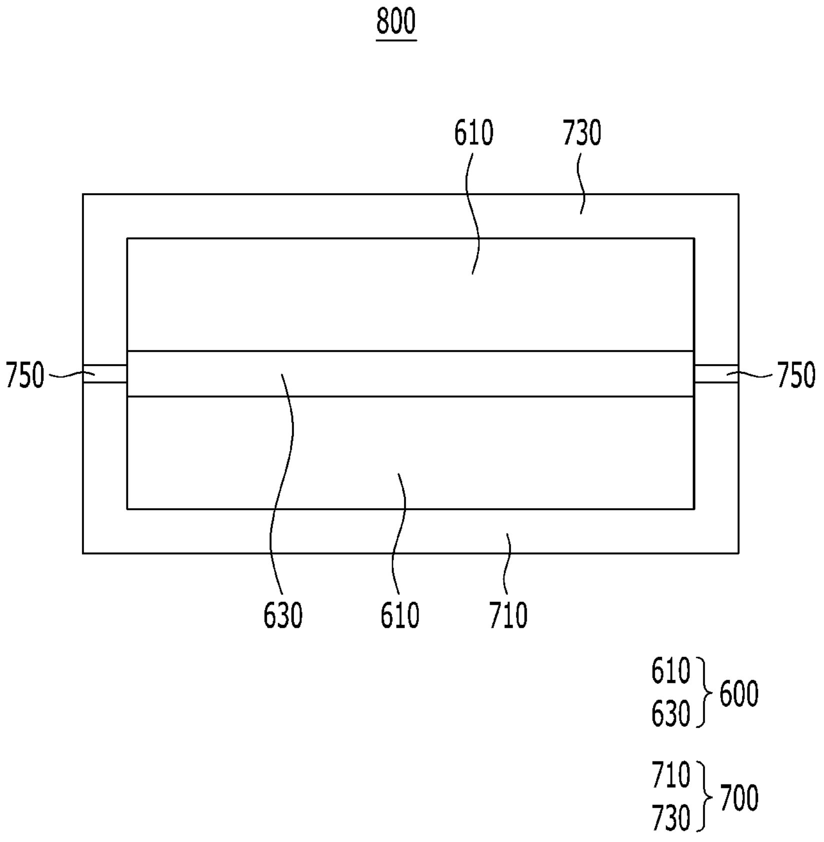

【FIG. 10】
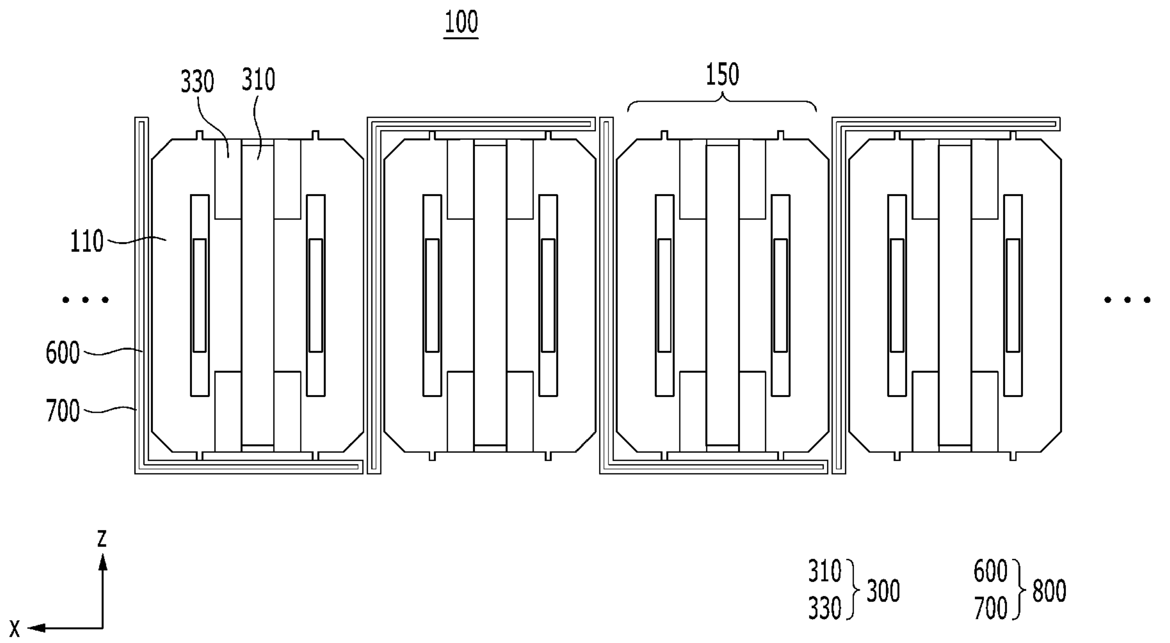
【FIG. 11】
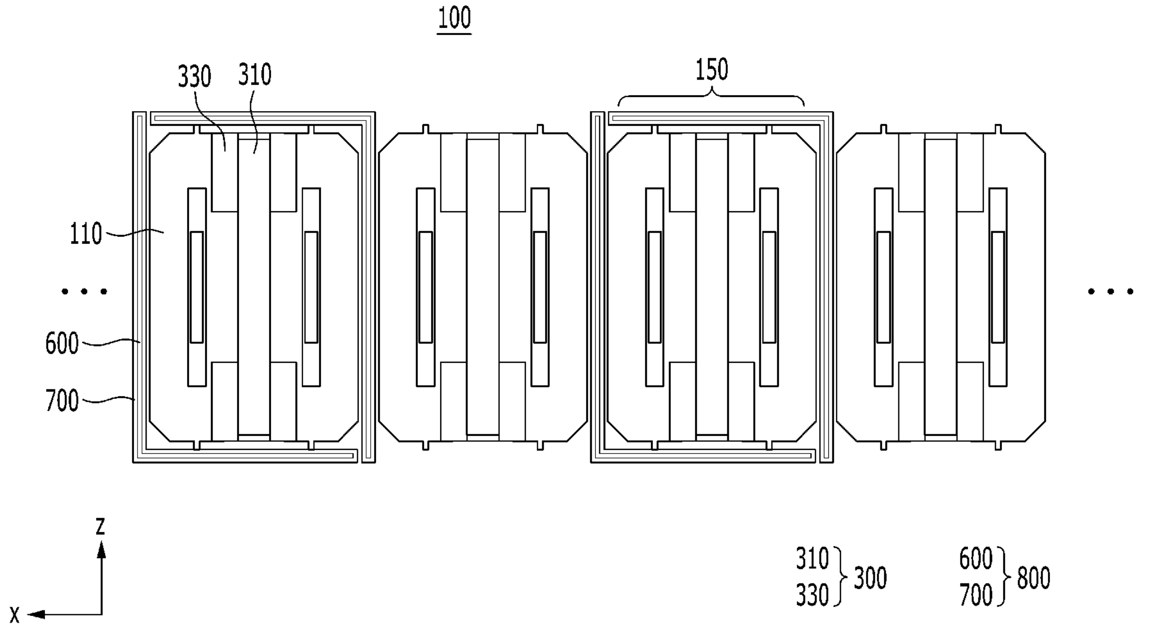

【FIG. 12】
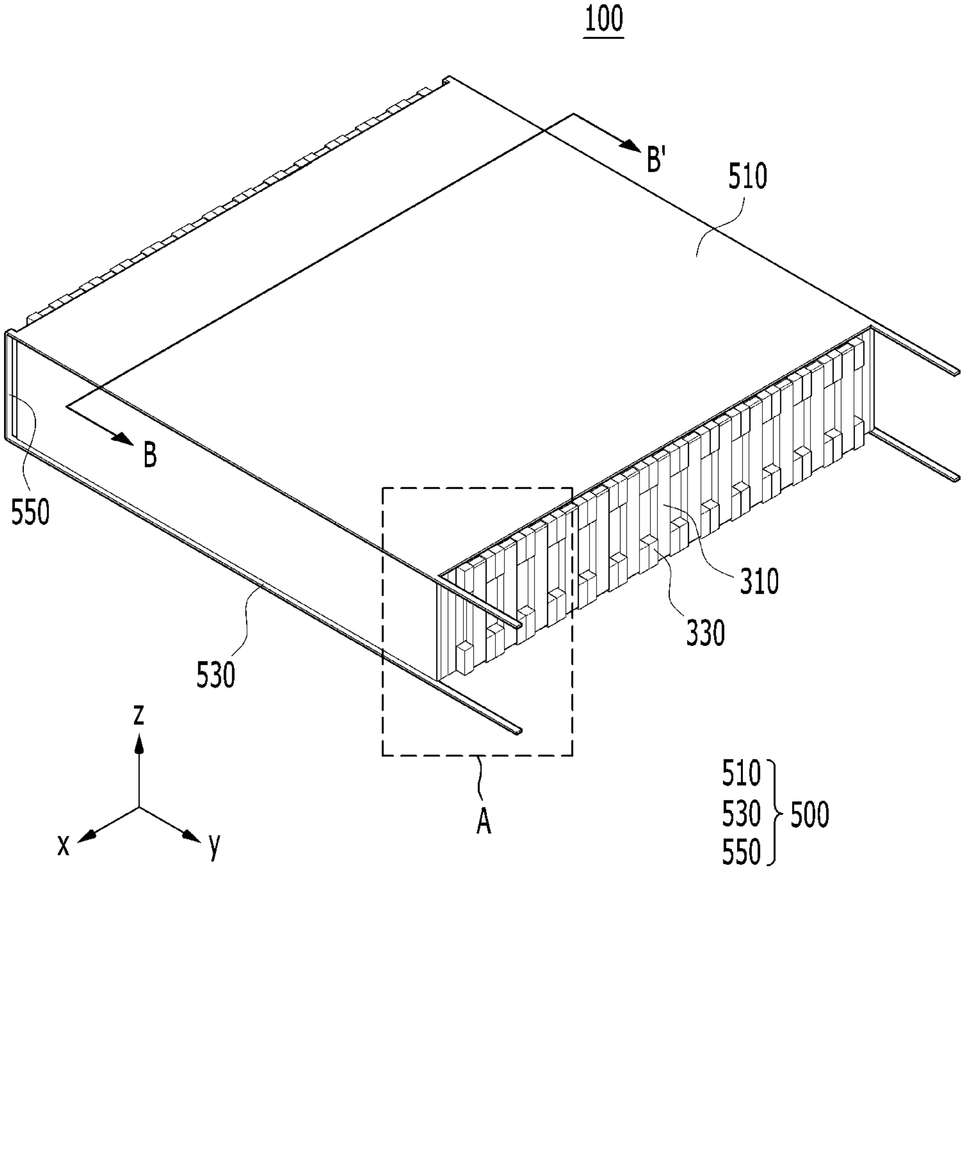

【FIG. 13】
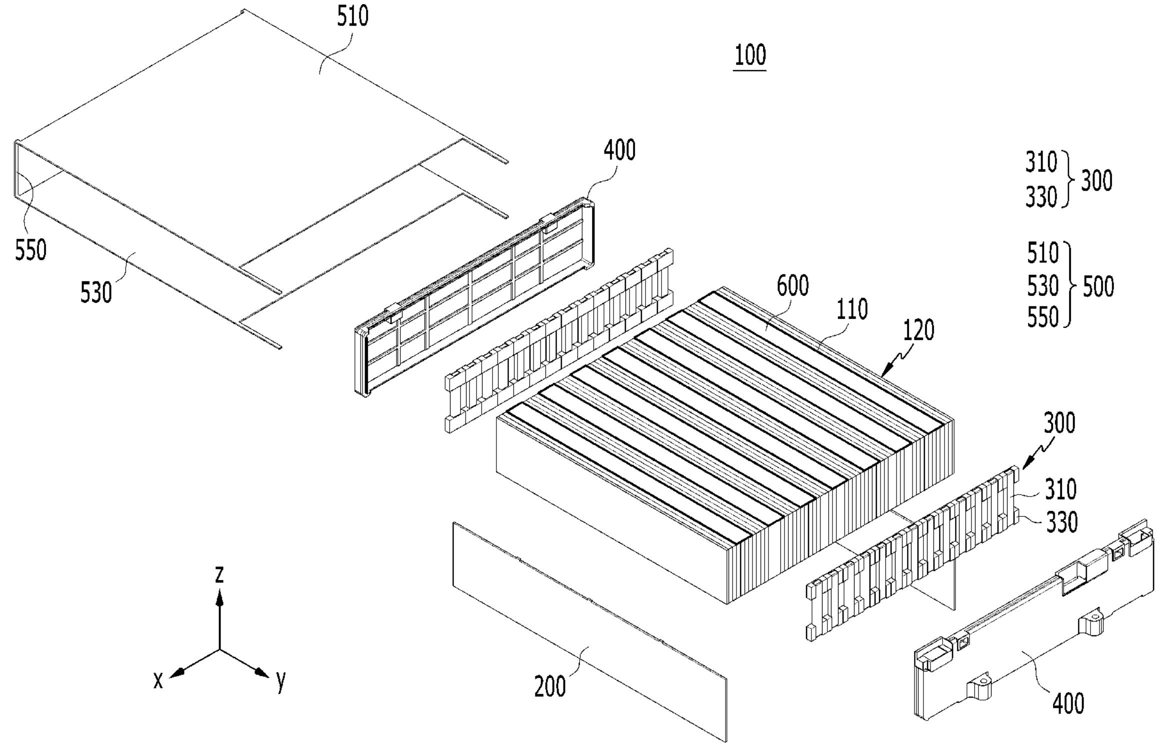

【FIG. 14】
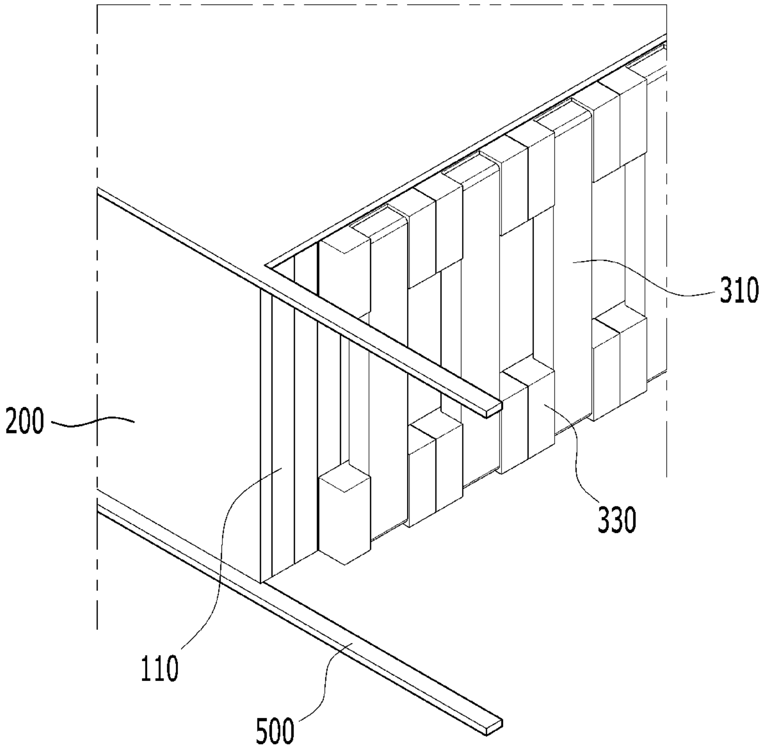

【FIG. 15】
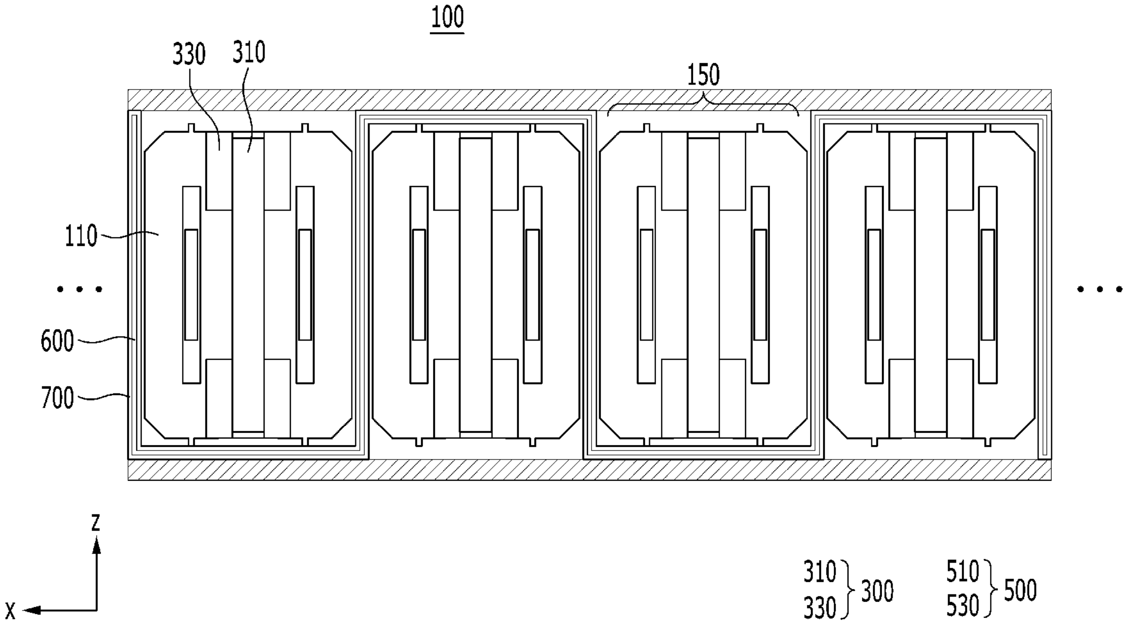
【FIG. 16】
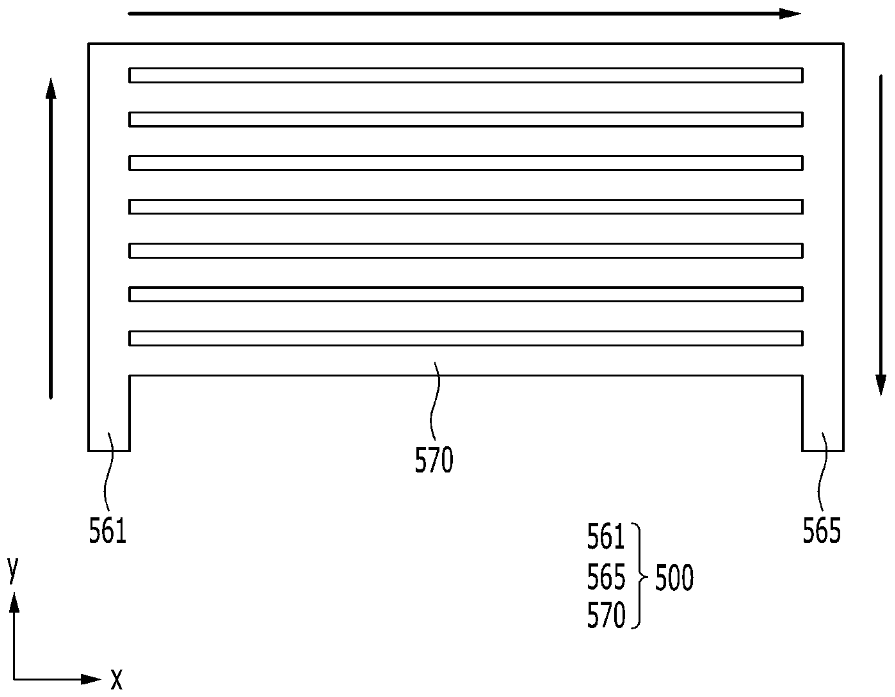

【FIG. 17】
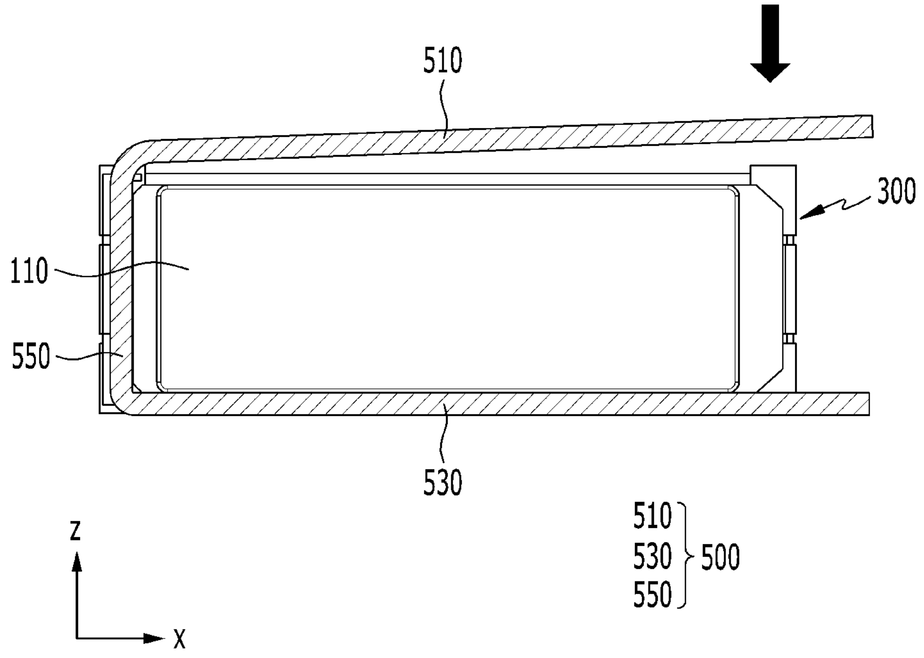

BATTERY MODULE AND BATTERY PACK INCLUDING THE SAME

CROSS CITATION WITH RELATED APPLICATION(S)

This application claims the benefit of Korean Patent Application No. 10-2021-0159975 filed on Nov. 19, 2021 and Korean Patent Application No. 10-2022-0140425 filed on Oct. 27, 2022 in the Korean Intellectual Property Office, the entire contents of which are incorporated herein by reference.

TECHNICAL FIELD

The present disclosure relates to a battery module and a battery pack including the same, and more particularly, to a battery module having enhanced cooling performance, and a battery pack including the same.

BACKGROUND

With the technology development and increased demand for mobile devices, demand for secondary batteries as energy sources has been rapidly increasing. A variety of researches on batteries capable of meeting various needs have been carried out accordingly.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, as the need for a large-capacity secondary battery structure is increasing along with the utilization of the secondary battery as an energy storage source, there is a growing demand for a battery pack of middle or large-sized module structure which is an assembly of battery modules in which a plurality of secondary batteries are connected in series or in parallel.

Meanwhile, when a plurality of battery cells are connected in series or in parallel to configure a battery pack, it is common to configure a battery module composed of at least one battery cell and then configure a battery pack by using at least one battery module and adding other components. Since the battery cells constituting these middle or large-sized battery modules are composed of chargeable/dischargeable secondary batteries, such a high-output and large-capacity secondary battery generates a large amount of heat in a charge and discharge process. In this case, edge portions of the battery cells may be directly or indirectly arranged with a heat sink disposed in the battery pack, and can be cooled while transferring heat to the heat sink. However, since there may be a difference in the degree of contact between the battery cells and the heat sink, which may cause deterioration of a cooling performance. Therefore, in order to solve these drawbacks, a method of providing a cooling fin directly contacting the edge portions of battery cells or a heat sink directly contacting one surface of battery cells, and the like are known. The above method will be described in detail below.

FIG. 1 is a cross-sectional view of a conventional battery module. FIG. 2 is a plan view of a conventional battery module.

Referring to FIGS. 1 and 2, in a conventional battery module 10, a battery cell stack 12 in which a plurality of battery cells 11 are stacked is housed in a module frame 15, and the battery module 10 is mounted on a heat sink 40 disposed in a pack housing.

Edge portions of the battery cells 11 constituting the battery cell stack 12 can be cooled by indirectly contacting the heat sink 40. However, in this case, the edge portion of each battery cell 11 has a problem that the cooling performance may deteriorate due to contact deviation with the heat sink 40.

In addition, a cooling fin 45 is disposed at the edge portion of each battery cell 11, and the battery cells 11 and the cooling fin 45 may also directly contact each other to perform cooling. Specifically, the cooling fin 45 includes a fixing pin 46 and a cooling plate 47.

The fixing pin 46 is positioned while being in contact with the edge region of the battery cell 11, and can directly receive heat generated from the battery cell 11. The cooling plate 47 is located while being in contact with one surface of the battery cell 11, directly receives heat generated from the battery cell 11, and is fixed and positioned to the fixing pin 46.

The cooling fin 45 has a smaller thickness than the heat sink 40 and thus, can improve energy density, and it directly contacts the battery cell 11 and thus, can improve the cooling efficiency. When the thickness of the cooling fin 45 is reduced to a certain thickness or less, the cooling performance may deteriorate and the assembly may not be easy.

In addition, since the positions of the cooling fins 45 are fixed and the edge regions of the battery cells 11 are constrained by the cooling fins 45, there was a problem that the battery cell case is damaged or deformed when a swelling phenomenon of a battery cell 11 has occurred.

DETAILED DESCRIPTION OF THE INVENTION

Technical Problem

It is an object of the present disclosure to provide a battery module having improved cooling performance and energy density, and a battery pack including the same.

However, the problem to be solved by embodiments of the present disclosure is not limited to the above-described problems, and can be variously expanded within the scope of the technical idea included in the present disclosure.

Technical Solution

According to an aspect of the present disclosure, there is provided a battery module comprising: battery cells stacked along a first direction; a heat conducting member that transfers heat generated from the battery cells to the outside; and an insulating member surrounding the heat conducting member, wherein at least one or more of the battery cells form a first battery cell group and a second battery cell group, and the first battery cell group and the second battery cell group are stacked to form a battery cell stack, each battery cell group having a first surface, a second surface, a third surface and a fourth surface, wherein a heat dissipation member includes the heat conducting member and the insulating member wherein the heat dissipation member may cover the first surface and the third surface of the first battery cell group, the first surface facing the second battery cell group, the third surface being perpendicular to the first direction, and wherein the heat dissipation member may cover the first surface and the third surface of the second battery cell group, the first surface facing the first battery cell group, the third surface being perpendicular to the first direction.

The heat conducting member may have a laminated structure.

The heat conducting member includes a first heat conducting member and at least one second heat conducting member, and the first heat conducting member and the at least one second heat conducting member may be heat-sealed and laminated with an adhesive being interposed therebetween.

The at least one second heat conducting member is a plurality of second heat conducting members, and the first heat conducting member may be positioned between the plurality of second heat conducting members.

The first heat conducting member is graphite (Gr), and the at least one second heat conducting member may be aluminum (Al).

The heat conducting member may be one of graphite (Gr), aluminum (Al), and combinations thereof.

The insulating member comprises a first insulating member and a second insulating member, and the heat conducting member may be positioned between the first insulating member and the second insulating member.

The first insulating member and the second insulating member surrounds an outer peripheral surface of the heat conducting member, and the first insulating member and the second insulating member may be heat-sealed to contact each other.

The heat dissipation member extends along the battery cell stack in a zigzag shape.

The heat dissipation member may be a first heat dissipation member contacting the first battery cell group and a second heat dissipation member contacting the second battery cell group.

The first heat dissipation member may cover the first surface and the third surface of the first battery cell group, and the second heat dissipation member may cover the second surface and the fourth surface of the second battery cell group adjacent to the first battery cell group.

The first heat dissipation member may cover the first surface and the third surface of the first battery cell group, and the second heat dissipation member may cover the second surface and the fourth surface of the second battery cell group.

A thickness of the heat conducting member may be between 0.1 mm and 0.2 mm.

For each battery cell group, the first surface and the second surface may be side surfaces, the third surface may be an upper surface, and the fourth surface may be a lower surface.

The battery module may further comprise a module frame that covers both side surfaces of the battery cell stack facing each other in the first direction, and a busbar assembly that includes a busbar electrically connected to the battery cell stack and a busbar frame fixing the busbar.

The heat dissipation member may contact a third surface and a fourth surface of the busbar assembly, and the third surface and the fourth surface of the busbar assembly may face each other in a direction perpendicular to the first direction.

The busbar assembly may be provided on a fifth surface and a sixth surface of each battery cell group, and the fifth surface and the sixth surface may face each other and are perpendicular to the first direction.

The fifth surface may be a front surface of the battery cell stack, and the sixth surface may be a rear surface of the battery cell stack.

The busbar assembly may be provided for each battery cell group.

A number of the busbar assembly may be equal to a number of the battery cell groups.

According to another embodiment of the present disclosure, there is provided a battery pack comprising: the battery module, and a heat sink that comprises a first heat sink positioned on a third surface of the battery cell stack, a second heat sink positioned on a fourth surface of the battery cell stack, and a connection part that connects the first heat sink and the second heat sink.

The first heat sink may have a size equal to or larger than a size of the third surface of the battery cell stack, and the second heat sink may have a size equal to or larger than a size of the fourth surface of the battery cell stack.

End portions of the first heat sink and the second heat sink may be connected by the connection part.

The connection part may be a passage that extends in a direction perpendicular to the first direction and connects the first heat sink and the second heat sink.

The connection part may be a passage through which edges of the first heat sink and the second heat sink are connected.

The heat sink may comprise an inlet through which coolant is made to flow in from the outside, an outlet through which coolant is discharged to the outside, and a flow path that connects the inlet and the outlet.

The flow path may be at least one passage that branches off from one edge of the heat sink where the inlet and the outlet are located.

The heat sink may be provided so that the connection part abuts on one edge of the battery cell stack.

The heat sink may be fixed to the battery module using a coupling member or an adhesive.

According to yet another embodiment of the present disclosure, there is provided a device comprising the above-mentioned battery pack.

Advantageous Effects

According to the embodiments of the present disclosure, a heat conducting member surrounding the battery cells is provided, thereby improving the cooling performance of the battery module.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a cross-sectional view of a conventional battery module;

FIG. 2 is a plan view of a conventional battery module;

FIG. 3 is a perspective view of a battery module according to an embodiment of the present disclosure;

FIG. 4 is an exploded perspective view of a battery module according to an embodiment of the present disclosure;

FIG. 5 is a perspective view of the battery module excluding the end plate of FIG. 3;

FIG. 6 is a diagram showing a state when FIG. 5 is viewed in the y-axis direction;

FIG. 7 is a top view of a heat dissipation member according to an embodiment of the present disclosure;

FIG. 8 is a cross-sectional view of the heat dissipation member of FIG. 7;

FIG. 9 is a cross-sectional view of a heat dissipation member according to another embodiment of the present disclosure;

FIGS. 10 and 11 are diagrams showing modifications of FIG. 6;

FIG. 12 is a perspective view showing a structure in which the battery module of FIG. 5 includes a heat sink;

FIG. 13 is an exploded perspective view of FIG. 12;

FIG. 14 is an enlarged view showing an area A of FIG. 12;

FIG. 15 is a diagram showing a state when FIG. 12 is viewed in the x-axis direction;

FIG. 16 is a top view showing a state when FIG. 12 is cut along the line B-B'; and FIG. 17 is a cross-sectional view showing a state when FIG. 12 is viewed in the y-axis direction.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and same reference numerals designate same or like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being “on” or “above” another element, it can be directly on the other element or intervening elements may also be present. In contrast, when an element is referred to as being “directly on” another element, it means that other intervening elements are not present. Further, the word “on” or “above” means disposed on or below a reference portion, and does not necessarily mean being disposed on the upper end of the reference portion toward the opposite direction of gravity.

Further, throughout the description, when a portion is referred to as “including” or “comprising” a certain component, it means that the portion can further include other components, without excluding the other components, unless otherwise stated.

Further, throughout the description, when referred to as “planar”, it means when a target portion is viewed from the upper side, and when referred to as “cross-sectional”, it means when a target portion is viewed from the side of a cross section cut vertically.

FIG. 3 is a perspective view of a battery module according to an embodiment of the present disclosure. FIG. 4 is an exploded perspective view of a battery module according to an embodiment of the present disclosure.

Referring to FIGS. 3 and 4, a battery module 100 according to one embodiment of the present disclosure includes a battery cell stack 120 in which a plurality of battery cells 110 are stacked, a module frame 200 that covers both side surfaces (x-axis direction and −x-axis direction) facing each other in the stacking direction of the battery cell stack 120, a busbar assembly 300 assembled and positioned on the front surface and rear surface (y-axis direction and −y-axis direction) of the battery cell stack 120 facing each other in the longitudinal direction of the battery cell perpendicular to the stacking direction and the plane, end plates 400 that cover the busbar assembly 300, and a heat dissipation member 800 that includes a heat conducting member 600 and an insulating member 700 disposed in a zigzag shape on the battery cell stack 120.

Here, the stacking direction may be the x-axis direction and the −x-axis direction in the stacking direction of the battery cell stack 120, and the longitudinal direction of the battery cell may be the y-axis direction and the −y-axis direction, which are perpendicular to the stacking direction and the plane.

Further, surfaces facing in the stacking direction of the battery cell stack may be defined as a first surface (x-axis direction) and a second surface (−x-axis direction), respectively, which may mean both side surfaces for the sake of convenience. That is, the first surface may be one side surface and the second surface may be the other side surface. Surfaces facing in a direction perpendicular to the stacking direction of the battery cell stack may be defined as a third surface (z-axis direction) and a fourth surface (−z-axis direction), respectively, wherein for the sake of convenience, the third surface may be an upper surface and the fourth surface may be a lower surface. In addition, surfaces facing each other in a direction perpendicular to the stacking direction and the plane of the battery cell stack may be defined as a fifth surface (y-axis direction) and a sixth surface (−y-axis direction), wherein for the sake of convenience, the fifth surface may be a front surface and the sixth surface may be a rear surface. The invention will now be described in terms defined above.

First, the battery cell 110 may be a pouch-type battery cell. Such a pouch-type battery cell may be formed by housing the electrode assembly in a pouch case of a laminated sheet containing a resin layer and a metal layer, and then heat-sealing a sealing part of the pouch case. At this time, the battery cell 110 may be formed in a rectangular sheet-like structure.

Such a battery cell 110 may be formed in plural numbers, and at least one or more battery cells 110 may form a battery cell group 150. The battery cell group 150 may be stacked by electrically connecting at least one or more battery cells 110 to each other. For example, the battery cell group 150 may be stacked by electrically connecting two battery cells 110 to each other. At least one battery cell group 150 is stacked so as to be electrically connected to each other, thereby forming the battery cell stack 120. As shown in the figure, a plurality of battery cells 110 may be stacked along a direction parallel to the x-axis.

In the inside of the battery cell stack 120, the heat dissipation member 800 may be provided that transfers heat generated in the battery cell stack 120 to the outside while surrounding a part of the battery cell 110.

As an example, the heat dissipation member 800 may have a structure extending in one direction along the battery cells 110 in a zigzag shape while surrounding one battery cell 110 and other battery cell 110 adjacent thereto. Alternatively, the heat dissipation member 800 may have a structure extending in one direction along the battery cell groups 150 in a zigzag shape while surrounding one battery cell group 150 and other battery cell group adjacent thereto.

The module frame 200 may be a plate that covers the outer surface of the outermost battery cell 110 constituting the battery cell stack 120, respectively. That is, the module frame 200 may be a plate that covers the first surface and second surface (x-axis direction and −x-axis direction) facing each other in the stacking direction of the battery cell stack 120. The module frame 200 can protect the battery cell stack 120 from external impact. The module frame 200 may be made of a metal having stiffness, for example, aluminum.

In a conventional battery module, a battery cell stack was housed in a module frame having a fixed shape. As an example, a conventional module frame may be a rectangular parallelepiped that houses a battery cell stack while surrounding all surfaces of the battery cell stack. Therefore, when the shape of the battery cell stack is changed due to cell swelling, the battery cell stack and the module frame surrounding the battery cell stack are in contact with each other, so that the battery cell case was frequently damaged.

On the other hand, unlike the conventional case, in the battery module 100 according to an embodiment of the present disclosure, the battery cell stack 120 may not be housed in a module frame having a fixed shape. Specifically, the module frame 200 according to the present embodiment may be configured to surround only the outer surface of the outermost battery cell 110 constituting the battery cell stack 120. Therefore, even if the battery cell stack 120 is swollen and changed in its shape, the module frame 200 does not restrain it, and thus, damage to the battery cell case due to contact between the battery cell stack 120 and the module frame 200 may not occur. This makes it possible to achieve the structural stability of the battery module 100.

The busbar assembly 300 may be positioned while covering the fifth and sixth surfaces (y-axis direction and −y-axis direction) facing each other in the longitudinal direction perpendicular to the stacking direction and the plane of the battery cell stack 120, respectively. The busbar assembly 300 may include a busbar 310 and a busbar frame 330.

The busbar 310 may be electrically connected to electrode leads each protruding from the battery cell 110. The busbar 310 can electrically connect the battery cell stack 120 to the battery system.

The busbar 310 may be mounted on the busbar frame 330. The busbar frame 330 can fix the position of the busbar 310 and physically protect the battery cell stack 120 and the busbar 330 from external impact.

The end plate 400 is positioned on the fifth surface and sixth surface (y-axis direction and −y-axis direction) facing each other in the longitudinal direction perpendicular to the stacking direction and the plane of the battery cell stack 120, and can be formed so as to cover the battery cell stack 120. That is, the end plate 400 may be positioned while covering the busbar assembly 300. The end plate 400 can physically protect the battery cell stack 120 and other electrical components from external impact.

Next, the heat dissipation member 800 and the busbar assembly 300 will be described in more detail.

FIG. 5 is a perspective view of the battery module excluding the end plate of FIG. 3. FIG. 6 is a diagram showing a state when FIG. 5 is viewed in the y-axis direction.

Referring to FIGS. 5 and 6, for the battery cell stack 120 including a plurality of battery cell groups 150 composed of at least one or more battery cells 110, the heat dissipation member 800 is positioned while surrounding the battery cell group 150, and one busbar assembly 300 is positioned for each battery cell group 150.

The busbar assembly 300 may be provided on the fifth surface and sixth surface (y-axis direction and −y-axis direction) facing each other along the longitudinal direction of the battery cell group 150. The number of busbar assemblies 300 may be plural. As an example, the busbar assembly 300 may be provided corresponding to the number of each battery cell group 150. That is, the busbar assembly 300 may include a plurality of busbars 310 and a plurality of busbar frames 330 in correspondence with the number of each battery cell group 150. In this case, the number of busbar assemblies 300 may be the same as the number of battery cell groups 150.

Conventionally, the number of busbars may be plural, but the number of busbar frames including a plurality of busbars is only one. That is, a plurality of busbars are fixed and positioned to one busbar frame, and the shape and position of the busbar frame are also fixed. In this case, even if the position of the battery cell changes due to cell swelling, there was a problem that the position of the busbar, which is positioned while being in contact with a part of the battery cell, does not change, and thus, the shape change and damage of the battery cell case occur.

In contrast, the busbar assembly 300 according to an embodiment of the present disclosure is positioned corresponding to the fifth and sixth surfaces of each battery cell group 150. That is, the plurality of busbar assemblies 300 are not connected to each other, but are provided separately. Therefore, even if the shape and position of the battery cell 110 is changed due to cell swelling, problems such as shape change and damage of the battery cell 110 case due to the busbar frame 300 do not occur, and the assembling capability and structural stability of the battery module can be improved.

The heat dissipation member 800 may be provided while surrounding the first surface and second surface (x-axis direction and −x-axis direction) of any one battery cell group 150, and the third surface (z-axis direction) perpendicular to the first surface and second surface. In addition, the heat dissipation member 800 may be provided while surrounding the first surface and second surface (x-axis direction and −x-axis direction) of other battery cell group adjacent to any one battery cell group 150, and the sixth surface (−z-axis direction) perpendicular to the first surface and second surface.

That is, the heat dissipation member 800 can cover any one of the first surface and second surface of the battery cell group 150 facing the stacking direction of the battery cell stack 120, and any one of the third surface and fourth surface facing each other in a direction perpendicular to the stacking direction of the battery cell stack 120. In addition, the heat dissipation member 800 may cover any one of the first surface and second surface of the battery cell group 150 facing each other with the stacking direction of the battery cell stack 120 of the other battery cell group 150 adjacent to any one battery cell group 150, and any one of the third surface and fourth surface facing each other in a direction perpendicular to the stacking direction of the battery cell stack 120.

As an example, the heat dissipation member 800 may have a structure that extends in one direction along the plurality of battery cell groups 150 in a zigzag shape.

Alternatively, although not illustrated in this drawing, the heat dissipation member 800 may be provided while surrounding the first surface and second surface of any one battery cell 110, and the third surface perpendicular thereto. And, it can be provided while surrounding the first surface and second surface of another battery cell 110 adjacent to any one battery cell 110, and the sixth surface perpendicular thereto. That is, the heat dissipation member 800 may have a structure that extends in one direction along the plurality of battery cells 110 in a zigzag shape.

That is, the heat dissipation member 800 may be positioned while surrounding not only both side surfaces of the battery cell 110 and/or the battery cell group 150, but also the upper surface and lower surface that have not been directly cooled in the related art. Therefore, heat generated in the battery cell 110 can be more effectively transferred to the outside. In other words, since the heat dissipation member 800 is positioned while surrounding the upper surface and lower surface of the battery cell 110 or the battery cell group 150 and thus, enables direct cooling thereof, thereby improving the cooling performance of the battery module 100.

The heat dissipation member 800 can be positioned while being in contact with the battery cell group 150.

The heat dissipation member 800 includes a heat conducting member 600 and an insulating member 700 positioned while surrounding the heat conducting member 600, and the insulating member 700 allows the battery cell group 150 to be positioned while being in contact with the heat dissipation member 800. The heat conducting member 600 and the insulating member 700 will be described in detail below.

FIG. 7 is a top view of a heat dissipation member according to an embodiment of the present disclosure. FIG. 8 is a cross-sectional view of the heat dissipation member of FIG. 7.

Referring to FIGS. 7 and 8, the heat dissipation member 800 according to the present embodiment includes a heat conducting member 600 and an insulating member 700, and the heat conducting member 600 may be provided while being in contact with the insulating member 700.

The heat conducting member 600 may transfer heat generated in the battery cell 110 to the outside. The heat conducting member 600 may be provided while surrounding a part of the battery cell 110 or the battery cell group 150.

The heat conducting member 600 may be formed of a material having elasticity. As an example, the heat conducting member 600 may be aluminum (Al), graphite (Gr), or a combination thereof. Therefore, even if the thickness of the battery cell 110 is changed due to cell swelling, the shape of the heat conducting member 600 may be changed in response to the change in volume of the battery cell 110. That is, since the heat conducting member 600 does not transmit a force corresponding to the expansive force of the battery cell 110 to the battery cell 110 or does not transmit it to the extent that the battery cell 110 is damaged, so that the battery cell 110 may not be damaged. Therefore, the structural stability of the battery module 100 can be improved and the assembly properties can be improved.

The heat conducting member 600 may be formed to a certain thickness or less. Specifically, the thickness of the heat conducting member 600 may be smaller than the thickness of the battery cell 110. Preferably, the heat conducting member 600 may have a thickness of 0.1 mm to 0.2 mm. Therefore, the heat conducting member 600 is provided while surrounding the first surface and/or the second surface, and the fifth surface and/or the sixth surface of each battery cell 110 or battery cell group 150 constituting the battery cell stack 120, so that even if the area occupied by the heat conducting member 600 within the battery cell stack 120 is larger than that of conventional cooling members such as cooling fins, the energy density of the battery module 100 may not be affected.

Additionally, the heat conducting member 600 may be formed of a material having high thermal conductivity. For example, the heat conducting member 600 may be aluminum (Al), graphite, or a combination thereof. Therefore, the heat conducting member 600 can effectively transfer heat generated in the battery cell stack 120 to the outside, thereby improving the cooling performance of the battery module 100.

The heat conducting member 600 may be positioned while being in contact with the insulating member 700. The insulating member 700 may be a member that allows the heat conducting member 600 to secure insulation properties between the battery cell and other electrical components.

The insulating member 700 may be provided while surrounding the heat conducting member 600. More specifically, the insulating member 700 may be provided while surrounding the outer peripheral surface of the heat conducting member 600.

The heat conducting member 600 may be positioned between the two insulating members 700. The insulating member 700 includes a first insulating member 710 and a second insulating member 730, and the heat conducting member 600 may be positioned between the first insulating member 710 and the second insulating member 730.

The first insulating member 710 and the second insulating member 730 may be positioned with the heat conducting member 600 being interposed therebetween. Specifically, the first insulating member 710 may be positioned while being in contact with one surface of the heat conducting member 600, and the second insulating member 730 may be positioned while being in contact with the other surface of the heat conducting member 600.

The first insulating member 710 and the second insulating member 730 may be heat-sealed to each other with the heat conducting member 600 being interposed therebetween. In this case, the first insulating member 710 and the second insulating member 730 may include a heat sealed region 750 that is heat-sealed to each other. The heat sealed region 750 may be a region where the first insulating member 710 and the second insulating member 730 are heat-sealed while being in contact with each other.

The insulating member 700 may be made of a heat-sealable and insulating material. Also, the insulating member 700 may be made of a material having elasticity, so that it corresponds to the swelling of the battery cell 110 and the shape may be changed. However, the elasticity of the insulating member 700 may be less than that of the heat conducting member 600. Therefore, even if the thickness of the battery cell 110 changes due to cell swelling, the insulating member 700 can partially suppress the shape change of the battery cell 110 without damaging the case of the battery cell 110.

Moreover, the insulating member 700 may be a material having adhesive properties. Therefore, the insulating member 700 can adhere and fix the heat dissipation member 800 to the battery cell 110. That is, the shape of the heat dissipation member 800 is fixed due to the insulating member 700, so that the heat dissipation member 800 can be provided in a form of abutting on the battery cell 110. As an example, the insulating member 700 may be PET, and preferably, the insulating member 700 may be a PET tape.

That is, since the insulating member 700 is positioned while surrounding the heat conducting member 600, an insulation property of the heat conducting member can be ensured and, at the same time, the heat conducting member 600 can be positioned in a state of being fixed to the battery cell. Also, since the insulating member 700 is positioned in a state of being adhered onto the battery cell, it is possible to suppress the swelling of the battery cells by applying a force corresponding to the swelling of the battery cells, thereby improving the safety of the battery. Further, compared to the conventional battery module, the battery module according to the present embodiment can improve thermal conductivity and cooling performance due to the heat conducting member 600 positioned while surrounding the battery cells.

When the insulating member 700 is positioned while surrounding the outer surface of the heat conducting member 600, the sum of the thicknesses of the heat conducting member 600 and the insulating member 700 may be smaller than the thickness of an insulating layer formed by a conventional insulating coating. Therefore, the energy density of the battery can be improved. In addition, since the conventional insulating coating causes a height deviation in the process, the yield and performance of the battery may be reduced, whereas the insulating member 700 of the present embodiment is formed to have a constant height, the yield and performance of the battery can be improved.

FIG. 9 is a cross-sectional view of a heat dissipation member according to another embodiment of the present disclosure.

The heat conducting member illustrated in FIG. 9 is a modification of the embodiment of the present disclosure illustrated in FIGS. 7 and 8, and more information on the same components as those described above will be omitted.

Referring to FIG. 9, a heat conducting member 600 according to another embodiment of the present disclosure includes a first heat conducting member 610 and a second heat conducting member 630.

The first heat conducting member 610 and the second heat conducting member 630 may have a laminated structure. Specifically, the heat conducting member 600 may have a structure in which the first heat conducting member 610 is positioned between two second heat conducting members 630. At this time, an adhesive may be interposed between the first heat conducting member 610 and the second heat conducting member 630 to adhere and fix them. Specifically, the first heat conducting member 610 and the second heat conducting member 630 may be adhered and fixed by being heat-sealed with an adhesive interposed therebetween.

The first heat conducting member 610 and the second heat conducting member 630 may be made of dissimilar materials. As an example, the first heat conducting member 610 may be graphite (Gr), and the second heat conducting member 630 may be aluminum (Al).

Graphite (Gr) is superior in horizontal heat dissipation performance to aluminum (Al). Therefore, compared to the case where the heat conducting member 600 is formed by using each material alone, the case where the heat conducting member 600 is formed by combining these materials as in the present embodiment can improve the thermal conductivity and heat dissipation properties of the heat conductive member 600. That is, this makes it possible to improve the cooling performance of the battery module.

In addition, since graphite (Gr) has lower stiffness than aluminum (Al), the stiffness of the heat conducting member 600 can be supplemented by laminating aluminum (Al) with graphite (Gr). That is, compared to the case where the heat conducting member 600 is formed using graphite (Gr) alone, the heat conducting member 600 made of a combination of graphite (Gr) and aluminum (Al) has higher stiffness and thus, can improve durability of the battery.

FIGS. 10 and 11 are diagrams showing modifications of FIG. 6.

Referring to FIGS. 10 and 11, the heat dissipation member 800 can be positioned in the battery cell group 150 in various shapes.

The heat dissipation member 800 may be separated and provided for each battery cell group 150 unit. Specifically, the heat dissipation member 800 may be provided while covering any one of the first and second surfaces (x-axis direction or −x-axis direction), and the third surface (z-axis direction) or fourth surface (−z-axis direction) of the battery cell group 150.

As an example, referring to FIG. 10, the heat dissipation member 800 may have a structure separated for each unit of a battery cell group 150 in the structure of FIG. 6. That is, the heat dissipation member 800 may have a zigzag shape separated for each unit of the battery cell group 150.

Alternatively, referring to FIG. 11, the heat dissipation member 800 may be provided while surrounding one battery cell group 150. Specifically, one heat dissipation member 800 is positioned while being in contact with the first surface (x-axis direction) and the fourth surface (−z-axis direction) of the battery cell group 150, and another heat dissipation member 800 may be positioned while being in contact with the second surface (—x-axis direction) and the third surface (z-axis direction) of the battery cell group 150.

That is, the heat dissipation member 800 may have a plate shape having a right angle.

The heat dissipation member 800 having the above structure can perform the same role as a conventional heat dissipation fin. That is, the heat dissipation member 800 is separated and provided in units corresponding to each battery cell group 150, thereby capable of more flexibly coping with battery cell swelling as compared to the zigzag shape in which the heat dissipation members 800 are connected to one. That is, each of the heat dissipation members 800 does not structurally constrain the movement due to the expansion of the battery cell group 150, so that the structure of the battery cell is not damaged and thus, the safety of the battery can be improved.

The sum of the thicknesses of the heat conducting member 600 and the insulating member 700 may be smaller than that of the conventional cooling fin. As an example, the sum of the thicknesses of the heat conducting member 600 and the insulating member 700 may be 1 mm. Therefore, the energy density of the battery can be improved compared to the conventional one.

However, the shapes of the heat conducting member 600 and the insulating member 700 are not limited to the drawings, and includes all embodiments that can be easily modified and derived from the standpoint of those skilled in the art.

FIG. 12 is a perspective view showing a structure in which the battery module of FIG. 5 includes a heat sink. FIG. 13 is an exploded perspective view of FIG. 12. FIG. 14 is an enlarged view showing an area A of FIG. 12.

Referring to FIGS. 12 to 14, the battery module 100 according to an embodiment of the present disclosure further includes a heat sink 500 provided on the third side (z-axis direction) and the fourth side (−z-axis direction) of the battery cell stack 120.

The heat sink 500 can cool heat generated in the battery cell stack 120.

The heat sink 500 may include a flow path through which a coolant can move. The coolant may be a phase change fluid or a single phase fluid. For example, the coolant may be water, a mixture of water and ethylene glycol, and the like.

The heat sink 500 may be positioned while covering the third surface (z-axis direction) and the fourth surface (−z-axis direction) of the battery cell stack 120.

The heat sink 500 includes a first heat sink 510 positioned while covering the third surface (z-axis direction) of the battery cell stack 120, a second heat sink 530 positioned while covering the fourth surface (−z-axis direction) of the battery cell stack 120, and a connection part 550 that is a passage connecting the first heat sink 510 and the second heat sink 530.

The heat sink 500 may have a size equal to or larger than the size of the third side (z-axis direction) and the fourth side (−z-axis direction) of the battery cell stack 120. Therefore, the heat sink 500 covers the third surface (z-axis direction) and the fourth surface (−z-axis direction) of the battery cell stack 120, thereby capable of protecting the battery cell stack 120 from the outside and thus achieving the stability of the battery module 100. That is, the heat sink 500 can replace the roles of the upper module frame and the lower module frame in the conventional battery module.

The other end portions of the first heat sink 510 and the second heat sink 530 can be connected to each other. Specifically, an inlet and an outlet through which coolant is injected and discharged are positioned at one end portion of the first heat sink 510 and the second heat sink 530, respectively, and a connection part 550 is positioned at the other end portions of the first heat sink 510 and the second heat sink 530 facing thereto, and the first heat sink 510 and the second heat sink 530 may be connected to each other.

The connection part 550 may be connected to each vertex constituting the other end portions of the first heat sink 510 and the second heat sink 530. That is, one end portion of the connection part 550 may be connected to each of the vertices constituting the other end portions of the first heat sink 510 and the second heat sink 530. That is, the connection part 550 may be a passage that connects the first heat sink 510 and the second heat sink 530.

More specifically, the connection part 550 may be provided to extend in a direction perpendicular to the first heat sink 510 and the second heat sink 530. The connecting portion 550 may be a passage that extends in a direction perpendicular to the stacking direction of the battery cell stack 120. That is, the connecting part 550 may be a passage that extends along the height (z-axis direction) of the battery cell stack 120. The connection part 550 may be a passage in which two vertices (xy directions) constituting one edge of the upper heat sink 510 and the lower heat sink 530 are connected while corresponding to each other.

In this case, when the heat sink 500 is viewed in the x-axis direction, the heat sink 500 may have a square shape without one side. That is, the heat sink 500 may have a '⊏' shape. However, the structure of the heat sink 500 is not limited to the above description, and any structure including a material having cooling performance capable of sufficiently cooling heat generated from the battery module 100 is applicable.

The heat sink 500 may be a material having stiffness. As an example, the heat sink 500 may be made of aluminum (Al).

The heat sink 500 may be positioned while being inserted in the longitudinal direction (y-axis direction) of the module frame 200. In this case, the connection part 550 of the heat sink 500 corresponds to the height of the module frame 200 and may be positioned while the inlet and outlet are inserted in the longitudinal direction of the module frame 200.

FIG. 15 is a diagram showing a state when FIG. 10 is viewed in the x-axis direction.

Referring to FIG. 15, the heat dissipation member 800 is positioned with respect to the battery cell stack 120 including the plurality of battery cell groups 150 composed of two battery cells 110, one busbar assembly 300 is positioned in each battery cell group 150, and the heat sink 500 is positioned on the third surface (z-axis direction) and the fourth surface (−z-axis direction) of the battery cell stack 120.

The heat sink 500 is positioned while covering the third surface (z-axis direction) and the fourth surface (−z-axis direction) of the battery cell stack 120, and is positioned while facing the heat dissipation member 800 positioned on the third surface (z-axis direction) and the fourth surface (−z-axis direction) of the battery cell group 150. More precisely, the heat sink 500 is to positioned while being in contact with the heat dissipation member 800 positioned on the third surface (z-axis direction) and the fourth surface (−z-axis direction) of the battery cell group 150.

The heat dissipation member 800 can transfer heat generated in each battery cell 110 constituting the battery cell group 150 to the heat sink 500, and improve cooling performance of the battery module 100.

The heat dissipation member 800 can surround a first surface (x-axis direction) and/or a second surface (−x-axis direction) of the battery cell group 150, and a third surface (z-axis direction) and/or a fourth surface (−z-axis direction) perpendicular to the first surface and the second surface, but may be positioned while being in contact with the third surface (z-axis direction) and/or the fourth surface (−z-axis direction) of the busbar assembly 300, which is positioned in contact with the battery cell group 150 in addition to the battery cell group 150. That is, the heat dissipation member 800 may be positioned while being in contact with the battery cell group 150 and the busbar assembly 300.

The heat sink 500 may also be positioned while covering the third surface (z-axis direction) and the fourth surface (−z-axis direction) of the battery cell stack 120, but additionally, it may be positioned while covering the third surface (z-axis direction) and the fourth surface (−z-axis direction) of the bus bar assembly 300. In this case, heat generated not only from the battery cell stack 120 but also from the busbar assembly 300 may also be transferred to the heat sink 500 through the heat dissipation member 800 and cooled. Therefore, the cooling performance of the battery module 100 can be improved, and the life of the battery can be increased.

FIG. 16 is a top view showing a state when FIG. 12 is cut along the line B-B'. FIG. 17 is a cross-sectional view showing a state when FIG. 12 is viewed in the y-axis direction.

Referring to FIG. 16, the heat sink 500 includes an inlet 561 through which coolant is made to flow in from the outside, an outlet 565 through which the coolant is discharged to the outside, and a flow path 570 that connects the inlet 561 and the outlet 565, and the above structure makes it possible to cool heat generated in the battery module 100 while the coolant moves within the heat sink 500.

The flow path 570 constituting the heat sink 500 may have a manifold structure. Specifically, the inlet 561 and the outlet 565 may be provided while extending along the longitudinal direction (y-axis direction) of the battery cell stack 120, and the flow path 570 may be provided while extending along a direction (x-axis direction) perpendicular to the inlet 561 and the outlet 565. The passage 570 may be at least one passage that branches off from one edge of the heat sink 500 where the inlet 561 and the outlet 565 are positioned. In this case, an empty space may exist between at least one or more flow paths 570.

Referring to FIG. 17, the heat sink 500 may be inserted and placed in the battery module 100.

Specifically, the heat sink 500 is inserted into the battery module 100 so that the connection part 550 abuts on one edge of the battery cell 110, and fixed to the battery module 100.

When the heat sink 500 is inserted into the battery module 100, the heat sink 500 may have a shape in which the upper heat sink 510 is slightly raised. In this case, the upper heat sink 510 may be pressed toward the battery module 100. Specifically, the pressing direction of the upper heat sink 510 may be in the direction of the arrow shown in FIG. 17. After pressing the upper heat sink 510, the upper heat sink 510 may be fixed to the battery module 100. As an example, the upper heat sink 510 may be fixed to the battery module 100 using a coupling member such as a bolt or nut or an adhesive.

As described above, when the heat sink 500 and the battery module 100 are coupled using a coupling member, the coupling member may be positioned in an empty space located between at least one or more flow paths 570 to couple the heat sink 500 and the battery module 100 to each other.

The heat dissipation member 800 making contact with the heat sink 500 may be adhered and fixed to the heat sink 500 by the insulating member 700 constituting the heat dissipation member 800.

The above-mentioned battery module or the battery pack including the same can be applied to various devices. For example, such a device can be applied to a vehicle means such as an electric bicycle, an electric vehicle, or a hybrid vehicle, but the present disclosure is not limited thereto, and is applicable to various devices that can use a battery module or a battery pack including the same, which also falls within the scope of the present disclosure.

Although preferred embodiments of the present disclosure have been described in detail above, the scope of the present disclosure is not limited thereto, and various modifications and improvements can be made by those skilled in the art using the basic concepts of the present disclosure, which are defined in the appended claims, which also falls within the scope of the present disclosure.

DESCRIPTION OF REFERENCE NUMERALS

100: battery module
110: battery cell
120: battery cell stack
150: battery cell group
200: side surface frame
300: busbar assembly
310: busbar
330: busbar frame
400: end plate
500: heat sink
600: heat conducting member
700: insulating member
800: heat dissipation member

The invention claimed is:

1. A battery module comprising:

battery cells stacked along a first direction;

a heat conducting member that transfers heat generated from the battery cells to the outside; and an insulating member surrounding the heat conducting member, wherein at least one or more of the battery cells form a first battery cell group and a second battery cell group, and the first battery cell group and the second battery cell group are stacked to form a battery cell stack, each battery cell group having a first surface, a second surface, a third surface and a fourth surface, wherein a heat dissipation member includes the heat conducting member and the insulating member, wherein the heat dissipation member covers the first surface and the third surface of the first battery cell group, the first surface facing the second battery cell group, the third surface being perpendicular to the first direction, wherein the heat dissipation member covers the first surface and the third surface of the second battery cell group, the first surface facing the first battery cell group, the third surface being perpendicular to the first direction, wherein: the insulating member comprises a first insulating member and a second insulating member, and the heat conducting member is positioned between the first insulating member and the second insulating member and wherein: the first insulating member and the second insulating member surround an outer peripheral surface of the heat conducting member, and the first insulating member and the second insulating member are heat-sealed to contact each other.

2. The battery module according to claim 1, wherein:

the heat conducting member has a laminated structure.

3. The battery module according to claim 2, wherein:

the heat conducting member comprises a first heat conducting member and at least one second heat conducting member, and the first heat conducting member and the at least one second heat conducting member are heat-sealed and laminated with an adhesive being interposed therebetween.

4. The battery module according to claim 3, wherein:

the at least one second heat conducting member is a plurality of second heat conducting members, and the first heat conducting member is positioned between the plurality of second heat conducting members.

5. The battery module according to claim 3, wherein:

the first heat conducting member is graphite (Gr), and the at least one second heat conducting member is aluminum (Al).

6. The battery module according to claim 1, wherein:

the heat conducting member is one of graphite (Gr), aluminum (Al), and a combination thereof.

7. The battery module according to claim 1, wherein:

the heat dissipation member extends along the battery cell stack in a zigzag shape.

8. The battery module according to claim 1, wherein:

the heat dissipation member is a first heat dissipation member contacting the first battery cell group and a second heat dissipation member contacting the second battery cell group.

9. The battery module according to claim 8, wherein:

the first heat dissipation member covers the first surface and the third surface of the first battery cell group, and the second heat dissipation member covers the second surface and the fourth surface of the second battery cell group adjacent to the first battery cell group, or covers the second surface and the fourth surface of the second battery cell group.

10. The battery module according to claim 1, wherein:

a thickness of the heat conducting member is between 0.1 mm and 0.2 mm.

11. The battery module according to claim 1, further comprising:

a module frame that covers both side surfaces of the battery cell stack facing each other in the first direction, and a busbar assembly that includes a busbar electrically connected to the battery cell stack and a busbar frame fixing the busbar, the heat dissipation member contacts a third surface and a fourth surface of the busbar assembly, and the third surface and the fourth surface of the busbar assembly face each other in a direction perpendicular to the first direction.

12. The battery module according to claim 11, wherein:

the busbar assembly is provided on a fifth surface and a sixth surface of each battery cell group, and the fifth surface and the sixth surface face each other and are perpendicular to the first direction, the busbar assembly is provided for each battery cell group, and a number of the busbar assembly is equal to a number of the battery cell groups.

13. A battery pack comprising:

the battery module as set forth in claim 1, and a heat sink that comprises a first heat sink positioned on a third surface of the battery cell stack, a second heat sink positioned on a fourth surface of the battery cell stack, and a connection part that connects the first heat sink and the second heat sink.

14. The battery pack according to claim 13, wherein:

the first heat sink has a size equal to or larger than a size of the third surface of the battery cell stack, and the second heat sink has a size equal to or larger than a size of the fourth surface of the battery cell stack.

15. The battery pack according to claim 13, wherein:

end portions of the first heat sink and the second heat sink are connected by the connection part, and the connection part is a passage that extends in a direction perpendicular to the first direction and connects the first heat sink and the second heat sink.

16. The battery pack according to claim 15, wherein:

the connection part is a passage through which edges of the first heat sink and the second heat sink are connected.

17. The battery pack according to claim 13, wherein:

the heat sink comprises an inlet through which coolant is made to flow in from the outside, an outlet through which coolant is discharged to the outside, and a flow path that connects the inlet and the outlet, and the flow path is at least one passage that branches off from one edge of the heat sink where the inlet and the outlet are located.

18. The battery pack according to claim 13, wherein:

the heat sink is provided so that the connection part abuts on one edge of the battery cell stack.

* * * * *